United States Patent
Bian et al.

(10) Patent No.: US 6,858,331 B1
(45) Date of Patent: Feb. 22, 2005

(54) MAGNETIC THIN FILM MEDIA WITH A BI-LAYER STRUCTURE OF CRTI/NIP

(75) Inventors: Xiaoping Bian, San Jose, CA (US); Mary Frances Doerner, Santa Cruz, CA (US); Mohammad S. Mirzamaani, San Jose, CA (US); Adam Polcyn, San Jose, CA (US); Qi-Fan Xiao, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 10/651,634

(22) Filed: Aug. 29, 2003

(51) Int. Cl.[7] .............................. G11B 5/66; G11B 5/70; B05D 5/12; H01J 1/00
(52) U.S. Cl. ................................ 428/694 TS; 428/611; 428/667; 428/668; 428/900; 427/130; 427/131
(58) Field of Search .......................... 428/694 TS, 611, 428/667, 668, 900; 427/130, 131

(56) References Cited

U.S. PATENT DOCUMENTS

| | | | |
|---|---|---|---|
| 5,314,745 A | * | 5/1994 | Okumura ..................... 428/336 |
| 5,733,370 A | * | 3/1998 | Chen et al. .................. 117/105 |
| 5,789,056 A | | 8/1998 | Bian et al. ................... 428/65.3 |
| 5,879,783 A | | 3/1999 | Chang et al. ................ 428/141 |
| 5,922,456 A | | 7/1999 | Tanahashi et al. ........... 428/332 |
| 5,993,956 A | | 11/1999 | Lambeth et al. ............. 428/332 |
| 6,001,447 A | | 12/1999 | Tanahashi et al. .......... 428/65.3 |
| 6,077,586 A | | 6/2000 | Bian et al. .................. 428/65.3 |
| 6,077,603 A | | 6/2000 | Zhang ......................... 428/332 |
| 6,316,097 B1 | * | 11/2001 | Liu et al. ..................... 428/332 |
| 6,497,925 B1 | * | 12/2002 | Chen et al. .................. 427/515 |
| 6,567,236 B1 | | 5/2003 | Doerner et al. ........... 360/97.01 |
| 6,596,419 B1 | * | 7/2003 | Chen et al. ............. 428/694 TS |
| 2002/0048692 A1 | * | 4/2002 | Hosokawa et al. ..... 428/694 TS |
| 2003/0059648 A1 | * | 3/2003 | Akimoto et al. ............. 428/693 |
| 2003/0219631 A1 | * | 11/2003 | Takahashi et al. ........... 428/695 |

* cited by examiner

*Primary Examiner*—Holly Rickman
(74) *Attorney, Agent, or Firm*—G. Marlin Knight

(57) ABSTRACT

A thin film magnetic media structure with a bi-layer structure of amorphous chromium titanium (CrTi) followed by an amorphous layer of nickel phosphorus (NiP) is disclosed. After the NiP has been deposited it is exposed to oxygen to form an oxidized surface. Preferably the underlayer is deposited directly onto the oxidized NiP surface. The bi-layer structure of CrTi/NiP promotes excellent in-plane crystallographic orientation in the cobalt alloy magnetic layer(s) and allows an ultra-thin chromium underlayer to be used which provides better control over grain size and distribution. When the CrTi/NiP bi-layer structure is combined with a circumferentially textured substrate, preferably glass, a high Mrt orientation ratio (OR) results.

20 Claims, 2 Drawing Sheets

MAGNETIC THIN FILM MEDIA WITH A BI-LAYER STRUCTURE OF CRTI/NIP

FIELD OF THE INVENTION

The invention relates to magnetic thin film media and methods for their fabrication and more particularly to materials for use in magnetic thin film disks prior to an underlayer.

BACKGROUND OF THE INVENTION

A typical prior art head and disk system 10 is illustrated in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded. Historically the substrate was AlMg with an amorphous NiP surface film deposited by wet electroless plating. The AlMg/NiP disk was considered to be the substrate on which thin films were vacuum deposited to form the layers of the magnetic media.

One embodiment of the thin films 21 typically used with a glass substrate includes an amorphous initial thin film which is called a pre-seed layer and is followed by a crystalline seed layer. Typically both the pre-seed layer and seed layer are relatively thin layers. In U.S. Pat. No. 5,789,056 to Bian, et al., the use of a crystalline CrTi seed layer is described. Following the seed layer is typically a chromium or chromium alloy underlayer such as Cr, CrV and CrTi. One or more ferromagnetic layers based on various alloys of cobalt follow the underlayer. For example, a commonly used alloy is CoPtCr. Additional elements such as tantalum and boron are also often used in the magnetic alloy. A protective overcoat layer is used to improve wearability and corrosion resistance. The disk embodiment described above is one of many possibilities. For example, multiple seed layers, multiple underlayers and multiple magnetic layers have all been proposed in the prior art.

U.S. Pat. No. 6,593,009 issued to Bian, et al. on Jul. 15, 2003 describes a thin film magnetic media structure comprising a pre-seed layer CrTi which presents an amorphous or nanocrystalline structure. In the following text the term amorphous will be used to include nanocrystalline. The preferred seed layer is said to be RuAl. The use of the CrTi/RuAl bi-layer structure provides superior adhesion to the substrate and resistance to scratching, as well as, excellent coercivity and signal-to-noise ratio (SNR) and reduced cost over the prior art.

U.S. Pat. No. 6,567,236 to Doerner, et al., describes a preferred embodiment of a layer structure as: an amorphous pre-seed layer of CrTi, a seed layer of RuAl, a crystalline underlayer of CrTi, a bottom ferromagnetic layer of CoCr, an antiferromagnetic coupling/spacer layer of Ru; and a top ferromagnetic structure including: a thin first sublayer of CoCr, CoCrB or CoPtCrB, and a thicker second sublayer of CoPtCr with a lower moment than the first sublayer.

U.S. Pat. No. 5,879,783 to Chang, et al., describes the use of a NiP seed layer which is sputtered deposited on a glass or glass-ceramic substrate, and the surface is roughened by oxidation. In U.S. Pat. No. 6,596,419 to Chen, et al., a magnetic recording medium is described that includes a seed layer comprising a material selected from the group consisting of oxidized NiP (NiPOx) and CrTi. The thickness of the seed layer is said to be about 4 nm to 6 nm. It is stated that the CrTi and NiPOx seed layers enhance the development of CoTi/Cr(200) and Co(11.0) crystallographic orientation, and help to reduce grain size of CoTi/Cr-alloy underlayers.

The preferred orientation (PO) of the various crystalline materials forming the layers on the disk, as discussed herein, is not necessarily an exclusive orientation which may be found in the material, but is merely the most prominent orientation. When the Cr underlayer is sputter deposited at a sufficiently elevated temperature on a NiP-coated AlMg substrate a [200] PO is usually formed. This PO promotes the epitaxial growth of [11–20] PO of the hexagonal close-packed (hcp) cobalt (Co) alloy, and thereby improves the magnetic performance of the disk. The [11–20] PO refers to a film of hexagonal structure whose (11–20) planes are predominantly parallel to the surface of the film. Likewise the [10–10] PO refers to a film of hexagonal structure whose (10—10) planes are predominantly parallel to the surface of the film. The [10–10] PO can be epitaxially grown on an appropriate underlayer with a PO of [112].

One technique used in the prior art to improve magnetic recording performance on thin film disks is circumferential polishing to create a pattern of fine "scratches" (circumferential texture) which are generally oriented along tracks (concentric circles) on the disk surface. The scale of the texture of commercial thin film disks is microscopic with a peak-to-valley of less than 5 nm typically. A 5 nm texture appears mirror-like to the untrained eye. Special polishing equipment is necessary to achieve circumferential texture this fine. The topography of the surface on which a thin film is deposited can have a significant effect on the way the film nucleates and grows and also upon its characteristics. So called circumferential texture on magnetic disks has been commonly used to influence the inplane magnetic anisotropy for a wide range of magnetic alloys. For longitudinal recording it is sometimes useful to have a higher coercivity (Hc) and Mrt in the circumferential direction than in the radial direction. The ratio of the circumferential Hc to the radial Hc is called the coercivity orientation ratio (OR). Similarly the ratio of the circumferential Mrt to the radial Mrt is called the Mrt orientation ratio (OR). Current disks typically use hexagonal close packed (hcp) cobalt alloys and most (but not all) circumferentially textured disks have an Hc or Mrt OR>1.

SUMMARY OF THE INVENTION

The applicants disclose a thin film magnetic media structure with a bilayer structure of amorphous chromium titanium (CrTi) followed by an amorphous layer of nickel phosphorus (NiP) deposited prior to the underlayer. After the NiP has been deposited it is preferably exposed to oxygen to form an oxidized surface. Preferably the underlayer is deposited directly onto the oxidized NiP surface. The bi-layer structure of CrTi/NiP promotes excellent in-plane crystallographic orientation in the cobalt alloy magnetic layer(s) and allows an ultra-thin chromium underlayer to be used which provides better control over grain size and distribution. When the CrTi/NiP bi-layer structure is combined with a circumferentially textured disk, preferably glass, a high Mrt orientation ratio (OR) results.

DETAILED DESCRIPTION OF THE INVENTION

For longitudinal media on glass or other nonmetallic substrates, it is important to maximize the c-axis in-plane crystallographic orientation and maintain the orientation ratio. Some seed layer materials contribute to good in-plane c-axis orientation when used on smooth or randomly polished substrates, but turn out not to be satisfactory for used on circumferential textured substrates because they produce a much lower orientation ratio (OR). The bi-layer structure described herein is composed of two amorphous or nanocrystalline layers. The structure is particularly suited to use on circumferentially textured substrates since it helps achieve a good in-plane c-axis orientation, as well as, a high orientation ratio.

Figure 1:
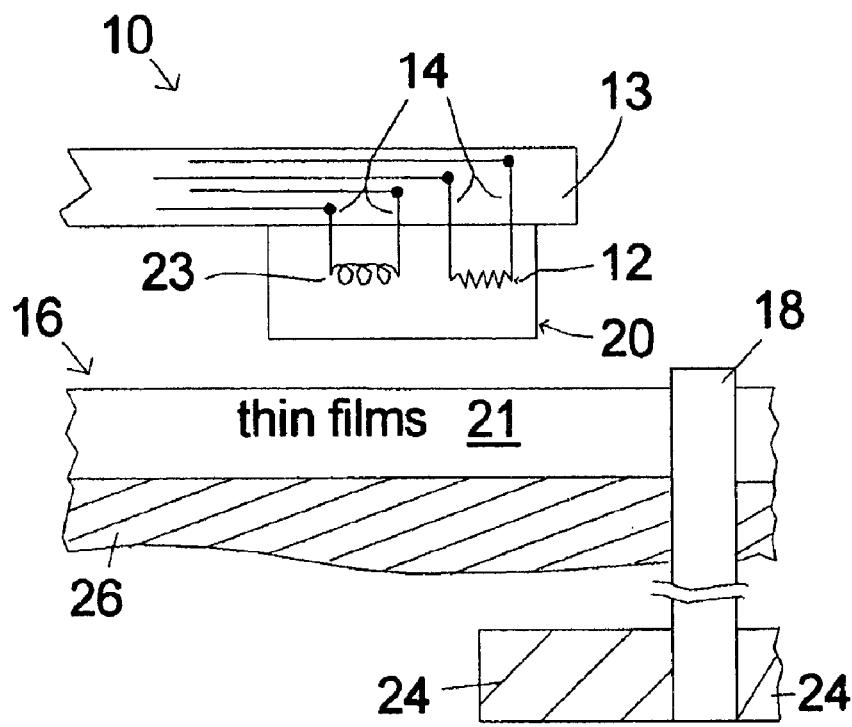
FIG. 1 is a symbolic illustration of the prior art showing the relationships between the head and associated components in a disk drive.
Figure 2:
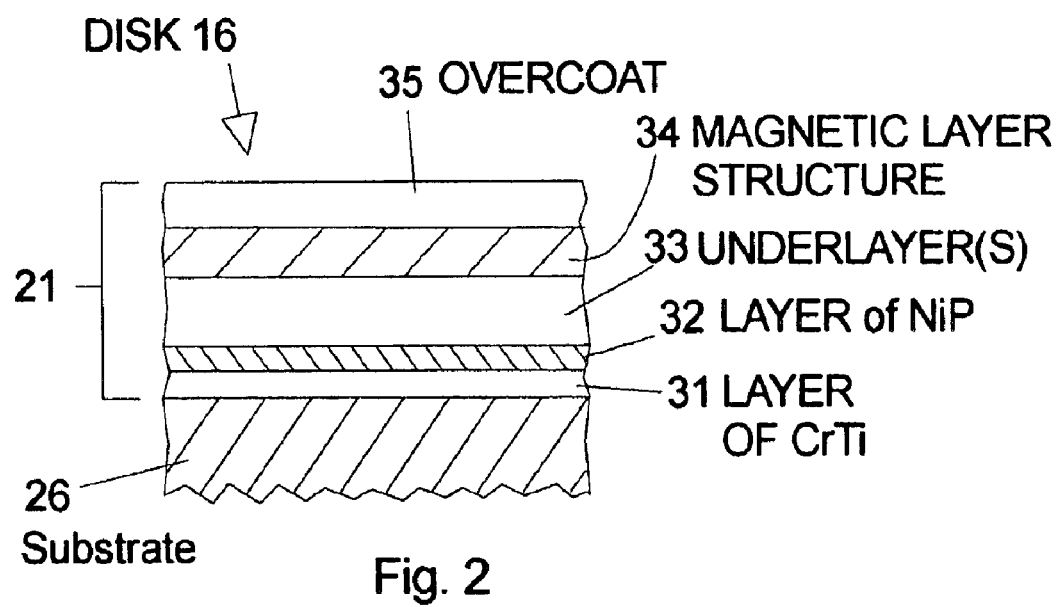
FIG. 2 is an illustration of a thin film layer stack for a magnetic thin film disk embodying the CrTi/NiP bi-layer structure of the invention.

Reference is made to FIG. 2 illustrate the thin film layers in a magnetic film disk 16 embodying the invention. In the embodiment shown in FIG. 2 the substrate 26 is preferably glass, but can be any other appropriate material. Even more preferably the substrate is circumferentially textured glass. The CrTi layer 31 is vacuum deposited directly onto the substrate surface 26. The NiP layer 32 is vacuum deposited onto the CrTi layer 31. These layers are preferably deposited at room temperature and without substrate voltage bias. The CrTi layer and NiP layers will be referred to collectively as the CrTi/NiP bi-layer structure. After the NiP layer has been vacuum deposited, the surface of the NiP is oxidized by supplying oxygen gas into the deposition chamber or by breaking vacuum and exposing the surface to the atmosphere. After the NiP surface has been oxidized the underlayer 33 is vacuum deposited directly onto NiP. The underlayer is preferably chromium, but can also be a chromium alloy. The bi-layer structure of the invention allows the underlayer 33 to be kept very thin. The advantage of having an ultra-thin underlayer is that control over the grain size and distribution is improved. In general, the thinner the underlayer, the smaller the spread in grain sizes. The magnetic layer structure 34 is followed by a protective overcoat layer 35.

The preferred range for the combined thickness of the CrTi/NiP bi-layer structure and the underlayer is from 60 to 150 angstroms. As an illustration, one embodiment of the invention has a 20 angstrom CrTi layer, a 45 angstrom NiP layer and a 40 angstrom chromium underlayer for a combined thickness of 105 angstroms. This is to be compared with an embodiment from the U.S. Pat. No. 6,593,009 issued to Bian, et al. of 200 angstroms CrTi, 60 angstroms RuAl and 60 angstroms of a CrTi underlayer.

Figure 3:
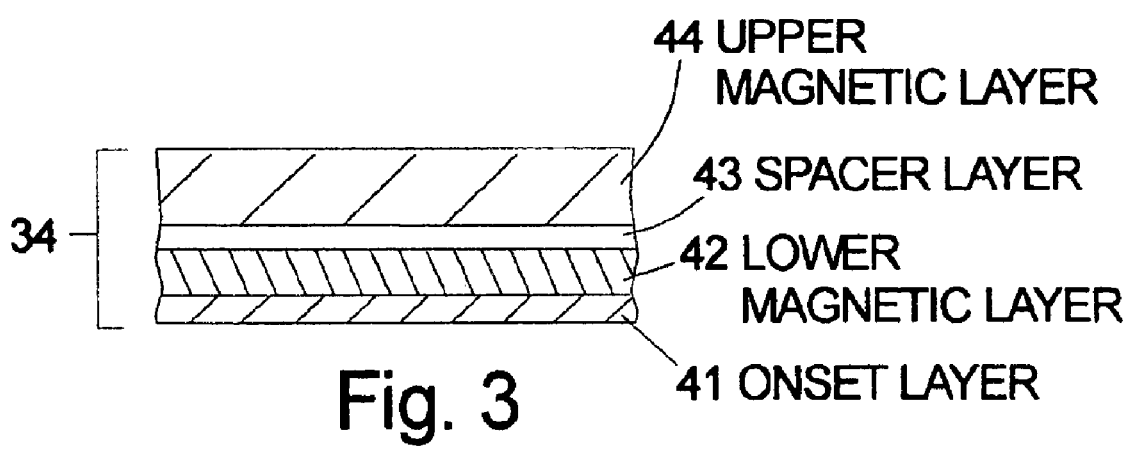
FIG. 3 is an illustration of an embodiment of a magnetic thin film layer structure for use in the layer stack of FIG. 2.

The bi-layer structure of the invention can be used with a wide range of magnetic layer structures 34. The magnetic layer structure 34 can be a single magnetic layer or it can comprise a combination of multiple magnetic layers, spacer layers, onset layers, etc. as are known in the art. An antiferromagnetically coupled magnetic layer stack can also be used. FIG. 3 illustrates a particular embodiment of the magnetic layer structure 34 that can be used with the bi-layer structure of the invention. The functions of the onset layer 41 are described in the prior art. In this embodiment CrMo is preferred. The lower magnetic layer 42 is preferably CoCr. The spacer layer 43 is preferably ruthenium. The upper magnetic layer 44 is preferably CoPtCrB.

In an experiment magnetic disks were prepared using NiP as a sole seed layer and the CrTi/NiP bi-layer structure of the invention. The underlayer was chromium and magnetic layer structures were as described above. The substrates were circumferentially textured glass. The measured results are given in Table 1.

TABLE 1

| Seed | Mrt | Hc | Mrt OR | Cr(200) Rocking Curve | | Co(11–20) Rocking Curve | |
| --- | --- | --- | --- | --- | --- | --- | --- |
| | | | | tangential | radial | tangential | radial |
| CrTi/NiP | 0.35 | 4100 | 2.0 | 6.6 | 12.9 | 6.0 | 10.4 |
| NiP | 0.36 | 3900 | 1.5 | 7.3 | 13.3 | 6.8 | 11.4 |

The Mrt orientation ratio (OR) was 1.5 for the NiP seed, but the CrTi/NiP of the invention yielded an Mrt OR 2.0. The higher OR is desirable. The FWHM rocking curve measurements relate to the distribution of the crystallographic orientations. Lower values indicate a smaller (better) distribution of orientations. The CrTi/NiP bi-layer structure yielded smaller rocking curve values for both the Cr(200) orientation and the Co(11–20) orientation.

The preferred compositional range for the CrTi layer is limited by the requirement that it remain amorphous; therefore, approximately from 45 to 55 at. % titanium should be used with 50 at. % being preferred. The preferred compositional range for NiP layer is from 15 to 25 at. % phosphorus which must likewise remain amorphous. NiP with 19 at. % phosphorus is particularly preferred. The atomic percent compositions are given without regard for the small amounts of contamination that invariably exist in sputtered thin films as is well known to those skilled in the art.

The invention has been described with respect to particular embodiments, but other uses and applications for the seed layer structure of the invention will be apparent to those skilled in the art.

What is claimed is:

1. A magnetic thin film storage medium comprising:

a substrate;

a layer of amorphous CrTi deposited onto the substrate;

a layer of amorphous NiP deposited onto ever the layer of CrTi;

at least one underlayer over the layer of amorphous NIP; and at least one magnetic layer over the underlayer.

2. The magnetic thin film storage medium of claim 1 wherein the layer of amorphous NiP has an oxidized surface formed after the layer of amorphous NiP was deposited.

3. The magnetic thin film storage medium of claim 2 wherein the underlayer is chromium that is deposited onto the oxidized surface of the layer of amorphous NiP.

4. The magnetic thin film storage medium of claim 1 wherein the substrate is circumferentially textured glass.

5. The magnetic thin film storage medium of claim 1 wherein the underlayer is chromium or an alloy of chromium.

6. The magnetic thin film storage medium of claim 1 wherein the layer of amorphous CrTi is approximately from 45 to 55 at. % titanium.

7. The magnetic thin film storage medium of claim 1 wherein the layer of amorphous NiP is approximately from 15 to 25 at. % phosphorus.

8. A disk drive comprising:
 a magnetic transducer including a read and a write head;
 a spindle; and
 a magnetic thin film disk mounted on the spindle, the magnetic thin film disk including a layer of amorphous CrTi followed by a layer of amorphous NiP deposited onto the layer of amorphous CrTi and at least one magnetic layer.

9. The disk drive of claim 8 wherein the layer of amorphous NiP has an oxidized surface formed after the layer of amorphous NiP was deposited.

10. The disk drive of claim 9 wherein the underlayer is chromium or a chromium alloy and is deposited onto the oxidized surface of the layer of amorphous NiP.

11. The disk drive of claim 9 wherein the substrate is circumferentially textured glass.

12. The disk drive of claim 9 wherein the layer of amorphous CrTi is approximately from 45 to 55 at. % titanium.

13. The disk drive of claim 9 wherein the layer of amorphous NiP is approximately from 15 to 25 at. % phosphorus.

14. A method of fabricating a magnetic thin film storage medium comprising the steps of:
 depositing a thin film of amorphous CrTi on a substrate; and
 depositing a thin film of NiP onto the thin film of CrTi.

15. The method of claim 14 further comprising the step of oxidizing an exposed surface of the thin film of NiP.

16. The method of claim 15 further comprising the step of depositing a thin film chromium underlayer onto the thin film of amorphous NiP.

17. The method of claim 15 wherein the substrate is circumferentially textured glass.

18. The method of claim 15 further comprising the step of depositing a thin film chromium alloy underlayer onto the thin film of amorphous NiP.

19. The method of claim 15 wherein the thin film of CrTi is approximately from 45 to 55 at. % titanium.

20. The method of claim 15 wherein the thin film of NIP is approximately from 15 to 25 at. % phosphorus.

\* \* \* \* \*

UNITED STATES PATENT AND TRADEMARK OFFICE
CERTIFICATE OF CORRECTION

PATENT NO. : 6,858,331 B1
DATED : June 1, 2005
INVENTOR(S) : Bian et al.

It is certified that error appears in the above-identified patent and that said Letters Patent is hereby corrected as shown below:

Column 4,
Line 55, delete the word "ever" so that the claim reads:
1. A magnetic thin film storage medium comprising:
a substrate;
a layer of amorphous CrTi deposited onto the substrate;
a layer of amorphous NiP deposited onto the layer of CrTi;
at least one underlayer over the layer of amorphous NIP; and
at least one magnetic layer over the underlayer.

Signed and Sealed this

Twelfth Day of July, 2005

JON W. DUDAS
*Director of the United States Patent and Trademark Office*